(12) United States Patent
Templeton et al.

(10) Patent No.: US 6,938,699 B2
(45) Date of Patent: Sep. 6, 2005

(54) VARIABLE ANGLE POWERED WORK IMPLEMENT

(75) Inventors: David J. Templeton, New Holland, PA (US); Randy A. Saylor, Hamburg, PA (US)

(73) Assignee: Turf Teq, LLC, New Holland, PA (US)

( * ) Notice: Subject to any disclaimer, the term of this patent is extended or adjusted under 35 U.S.C. 154(b) by 143 days.

(21) Appl. No.: 10/120,747

(22) Filed: Apr. 11, 2002

(65) Prior Publication Data

US 2002/0148211 A1 Oct. 17, 2002

Related U.S. Application Data

(60) Provisional application No. 60/283,163, filed on Apr. 12, 2001.

(51) Int. Cl.$^7$ .............................................. A01D 34/00
(52) U.S. Cl. ................................. 172/13; 172/14; 56/2
(58) Field of Search ........................... 56/2, 13.6, 13.7, 56/16.9, 17.5, DIG. 9, 249.5, 169, 16.7; 172/12–16, 40–42

(56) References Cited

U.S. PATENT DOCUMENTS

| | | | | | |
|---|---|---|---|---|---|
| 2,669,826 A | * | 2/1954 | Watrous | ...................... | 56/13.4 |
| 2,736,350 A | * | 2/1956 | Hill et al. | ...................... | 30/379 |
| 2,787,107 A | * | 4/1957 | Strasel | ...................... | 56/16.9 |
| 2,913,058 A | * | 11/1959 | Smith et al. | ................... | 172/15 |
| 2,998,082 A | * | 8/1961 | Roundy et al. | ............... | 172/42 |
| 3,106,251 A | * | 10/1963 | Lucas | ........................... | 172/16 |
| 3,537,244 A | * | 11/1970 | Hicks | ........................... | 56/17.1 |
| 3,603,162 A | * | 9/1971 | Gohler | ............................ | 74/16 |
| 3,668,845 A | * | 6/1972 | Parker | ........................... | 56/11.6 |
| 3,871,160 A | * | 3/1975 | Hooper | ....................... | 56/16.9 |
| 3,907,039 A | * | 9/1975 | Remley et al. | ................ | 172/15 |
| 4,077,731 A | * | 3/1978 | Holz et al. | ..................... | 404/83 |
| 4,192,525 A | * | 3/1980 | Clark | ........................... | 280/443 |
| 4,642,976 A | * | 2/1987 | Owens | ......................... | 56/16.9 |
| 4,718,221 A | * | 1/1988 | Wessel et al. | ................. | 56/16.9 |
| 4,936,886 A | * | 6/1990 | Quillen | ........................ | 56/16.7 |
| D311,009 S | * | 10/1990 | Wilkins | ........................ | D15/17 |
| 5,048,615 A | * | 9/1991 | Feldmann | ....................... | 172/1 |
| 5,050,372 A | * | 9/1991 | Heiskell | ...................... | 56/12.7 |
| 5,094,063 A | * | 3/1992 | Wattron et al. | .................... | 56/6 |
| 5,156,218 A | * | 10/1992 | Metzler et al. | ............... | 172/15 |
| 5,167,108 A | * | 12/1992 | Bird | ............................ | 56/13.7 |
| 5,179,823 A | * | 1/1993 | Pace | ........................... | 56/16.9 |
| 5,199,502 A | | 4/1993 | Hirata | .......................... | 172/15 |
| 5,603,205 A | * | 2/1997 | Foster | ........................ | 56/16.7 |
| 5,857,315 A | * | 1/1999 | Keane | ........................ | 56/16.9 |
| 6,003,292 A | * | 12/1999 | Waibel | ...................... | 56/320.2 |
| 6,003,611 A | * | 12/1999 | Martinez | ...................... | 172/15 |
| 6,256,970 B1 | * | 7/2001 | Fleener | ....................... | 56/12.7 |
| 6,345,489 B1 | * | 2/2002 | Everts et al. | ................. | 56/12.7 |
| 6,397,572 B1 | * | 6/2002 | Roundy et al. | .............. | 56/13.7 |
| 6,415,588 B1 | * | 7/2002 | Kao | ............................ | 56/16.7 |

FOREIGN PATENT DOCUMENTS

| | | | | | |
|---|---|---|---|---|---|
| GB | | 2089633 A | * | 6/1982 | ......... A01D/35/262 |
| WO | WO 8800004 A1 | | * | 1/1988 | .......... A01D/34/84 |

* cited by examiner

*Primary Examiner*—Thomas B. Will
*Assistant Examiner*—Alicia Torres
(74) *Attorney, Agent, or Firm*—Miller Law Group, PLLC

(57) ABSTRACT

A walk-behind power unit is configured to detachably mount a variety of work implements to perform a corresponding variety of operations from a single power unit. The power unit includes an implement mounting mechanism that is pivotable about a generally vertical pivot axis corresponding to the power output shaft of the engine on the power unit. An attached work implement can be moved laterally to change the operating characteristics through pivoting the implement to either side of a normal direction of travel. An landscape edger implement can be mounted so that the width of cut of the cutting disk is varied as the edger implement is pivoted. A mower implement can be attached so that the cutting path of the mower blade is offset laterally as the implement is pivoted, thus permitting the mower to mow around obstacles offset to the side of the direction of travel.

10 Claims, 10 Drawing Sheets

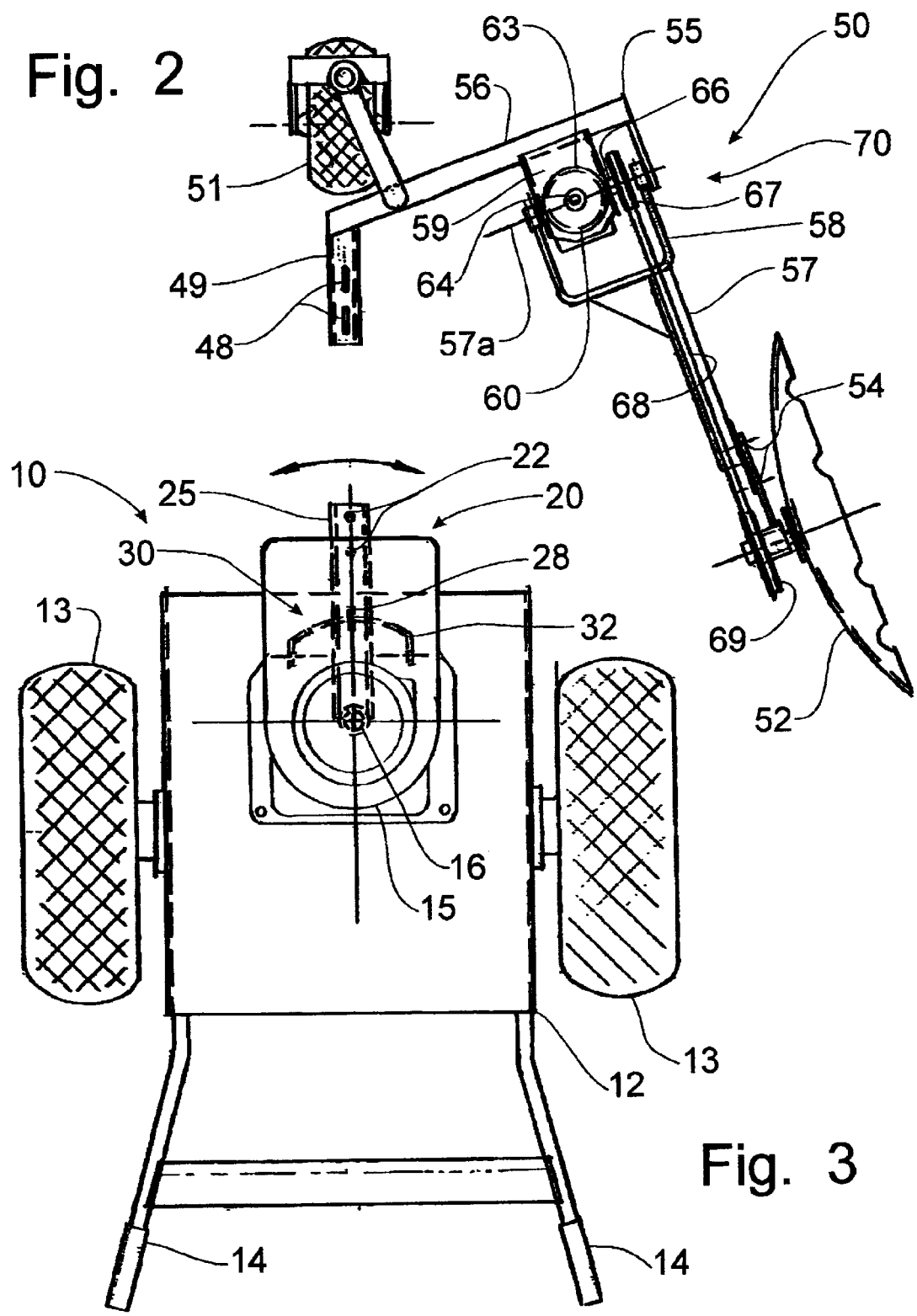

VARIABLE ANGLE POWERED WORK IMPLEMENT

CROSS-REFERENCE TO RELATED APPLICATIONS

This application claims domestic priority on U.S. Provisional Patent Application Ser. No. 60/283,163, filed Apr. 12, 2001, the description of which is hereby incorporated by reference.

BACKGROUND OF THE INVENTION

This invention relates generally to a powered utility apparatus and, more particularly, to a power unit that can be utilized with a variety of attachments to provide multiple uses therefor.

Powered walk behind or self-propelled tools are known in the art. Examples include brush mowers, lawn mowers, rotary brooms, string trimmers and edging mechanisms. Each such implement is operably driven by a dedicated power unit. It would be desirable to have the capability of utilizing a single such power unit for which different powered implements could be attached to perform the function desired. Such a power unit configuration would be more cost effective as the operator would be required to purchase only a single power unit that could be adapted for operative connection to a variety of implement attachments.

Edging mechanisms such as found in U.S. Pat. No. 5,199,502 and in U.S. Pat. No. 5,156,218 are fixed at an previously defined cutting angle with respect to the direction of travel of the mechanism. Changes in the cutting angle are not contemplated by such mechanisms; however, increasing the cutting angle as defined relative to the direction of travel would widen the trench that is formed by the rotation of the powered disk member. Increasing the cutting angle would also provide a different cross-sectional profile to the trench. The different trench profiles can be combined to improve the shape of the edging trench by first digging one shaped trench and then re-shaping the side of the first trench by moving the powered disk member along a second pass engaging one side of the first trench.

Furthermore, under conditions where the edge of the landscape area is covered with heavy, overgrown and/or rough sod edges, a conventional edging mechanism does not cut a trench that is wide enough to cut the sod roots adequately to permit an easy removal of the sod debris. By providing the capability of changing the cutting angle of the powered disk member, a wider trench can be formed whenever needed to solve such problems. Also, permitting the movement of the implement during operation allows the implement to be shifted in an offset direction to provide the capability of mowing under fence rails and other similar tasks.

SUMMARY OF THE INVENTION

It is an object of this invention to overcome the disadvantages of the prior art by providing a walk-behind power unit to which multiple implements can be detachably connected thereto.

It is an advantage of this invention that the plurality of implements that can be attached to the power unit will enable a single power unit to accomplish a wide variety of tasks.

It is a feature of this invention that an implement mounting mechanism is provided to accommodate a variety of detachable implements that can be operably powered by the walk-behind power unit.

It is another object of this invention to provide an implement mounting mechanism for a walk-behind power unit in which the implement can be laterally shifted while being operated.

It is another feature of this invention that the implement mounting mechanism is pivotable about a generally vertical axis of rotation to provide the ability to shift the implement attached to the power unit laterally.

It is still another feature of this invention that the vertical axis of rotation of the implement mounting mechanism corresponds to the powered output shaft of the engine forming a part of the walk-behind power unit.

It is another advantage of this invention that the pivotable implement mounting mechanism allows the attached implement to be operated in different configurations.

It is still another feature of this invention that the implement mounting mechanism is pivotable to both the left and right of a longitudinally extending axis, corresponding to the normal direction of travel of the power unit.

It is still another advantage of this invention that the operating characteristics of the attached implement can be varied by pivotally moving the implement left or right of the normal direction of travel.

It is still another object of this invention that a landscape edger implement can be detachably mounted to the power unit so as to be operable to cut a trough around the edge of a landscape bed.

It is yet another feature of this invention that the cutting disk of the landscape edger can be oriented with respect to the direction of travel to vary the orientation of the cutting disk with respect to the normal direction of travel of the walk-behind power unit.

It is yet another advantage of this invention that the pivotal movement of the edger implement about the vertical axis of rotation of the implement mounting mechanism varies the width of cut of the cutting disk to change the characteristics of the trough cut around a landscaped bed.

It is yet another object of this invention to provide a mower implement that can be detachably mounted to the implement mounting mechanism of the walk-behind power unit.

It is a further feature of this invention that the mower implement can be operated along different cutting paths offset to the side of a straight-ahead orientation by pivotally moving the implement mounting mechanism about its axis of rotation.

It is a further advantage of this invention that the mower implement can be moved laterally by the pivotally movable implement mounting mechanism to vary the orientation of the cutting path of the mower implement as the mower implement is being operated.

It is still a further advantage of this invention that the mower implement can be moved laterally to mow around an obstacle as the implement is moved along a direction of travel with the walk-behind power unit.

It is still a further feature of this invention that the drive transfer belts transferring operative rotational power from the engine on the power unit to the detachably connected implement is tensioned by the position of the driven portion of the implement.

It is a further object of this invention to provide a locking mechanism to control the pivotal movement of the implement mounting mechanism.

It is yet a further feature of this invention that the locking mechanism is spring-biased into a locking position to fix the implement in a pre-selected position until lateral movement of the implement is desired.

It is yet a further advantage of this invention that the spring-biased locking mechanism can be controlled from the handles of the walk-behind power unit.

It is still a further object of this invention to provide a power unit operable to power the operation of a variety of detachable work implements and which is durable in construction, inexpensive of manufacture, carefree of maintenance, facile in assemblage, and simple and effective in use.

These and other objects, features and advantages are accomplished according to the instant invention by providing a walk-behind power unit that is configured to detachably mount a variety of work implements to perform a corresponding variety of operations from a single power unit. The power unit includes an implement mounting mechanism that is configured to receive detachable work implements. The implement mounting mechanism is pivotable about a generally vertical pivot axis that corresponds to the power output shaft of the engine on the power unit. An attached work implement can be moved laterally to change the operating characteristics thereof by pivoting the implement mounting mechanism to either side of a normal direction of travel. An landscape edger implement is provide which will change the width of cut of the cutting disk as the edger implement is pivoted about the vertical pivot axis. A mower implement is provided that can laterally move the cutting path of the mower blade as the implement is pivoted about the vertical pivot axis to permit the mower to mow around obstacles offset to the side of the direction of travel.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a top plan view of an edger implement adapted for detachable connection to the implement mounting mechanism depicted in FIG. 1;

FIG. 3 is a top plan view of the power unit depicted in FIG. 1 in position to receive the edger implement shown in FIG. 2, the pivotal movement of the implement mounting mechanism being identified by an arcuate arrow;

DETAILED DESCRIPTION OF THE INVENTION

Figure 1:
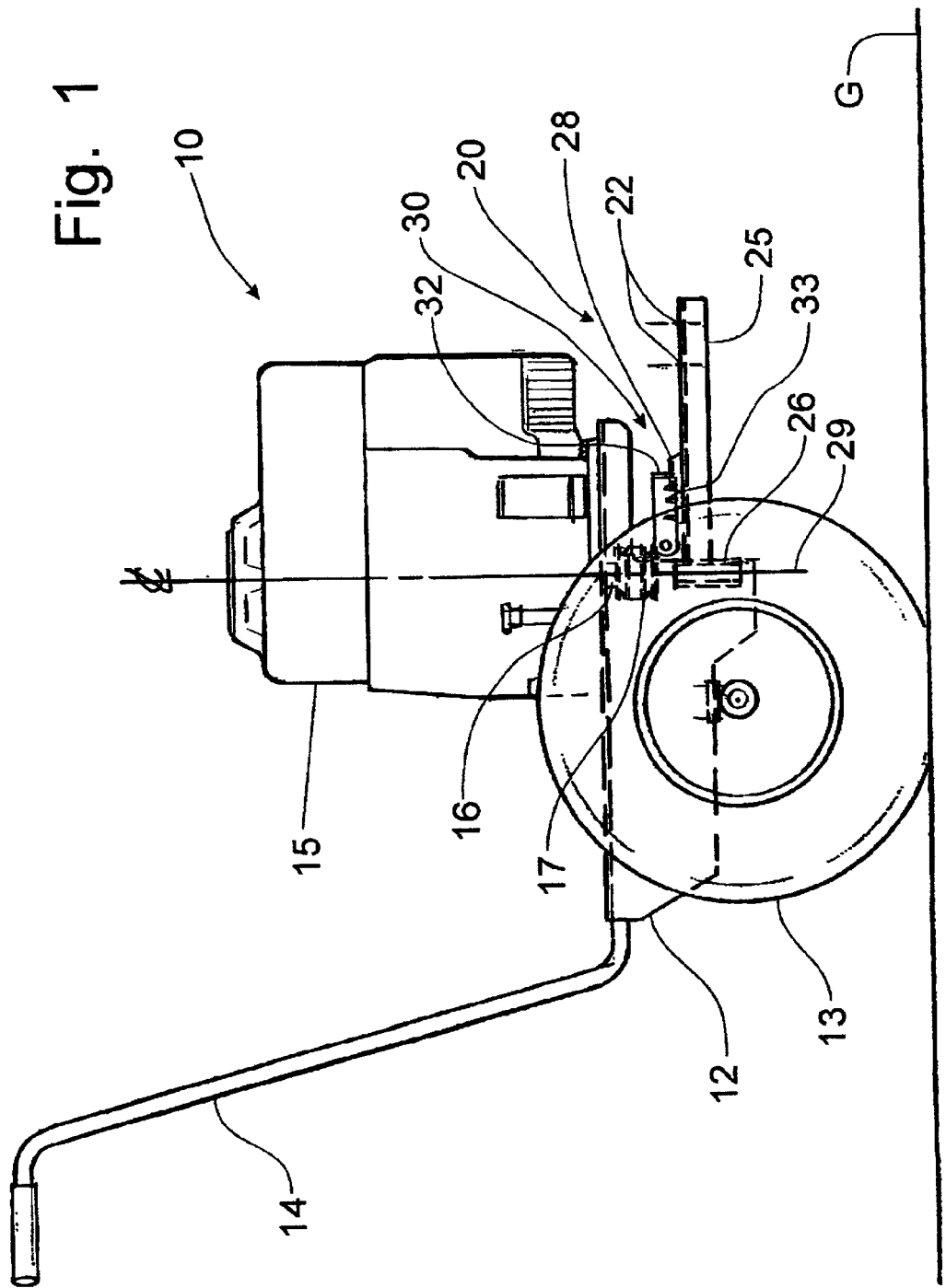
FIG. 1 is a right side elevational view of a walk-behind power unit incorporating the principles of the instant invention and having an implement mounting mechanism for the attachment of a variety of implement attachments, the vertical axis concentric with the engine output shaft being identified with a schematically imposed centerline.

Referring now to FIGS. 1–8, a walk-behind version of a power unit incorporating the principles of the instant invention can best be seen. Any left or right references are used as a matter of convenience and are determined by standing at the rear of the machine where the operator would walk gripping the handlebars to effect movement of the power unit in a forward direction. One skilled in the art will readily recognize that the principles of the instant invention can be applied to self-propelled or mounted versions of powered implements as well as to walk-behind versions; however, only the walk-behind version, as depicted in the drawings, will be described to exemplify the inventions.

A walk-behind power unit 10 is known in the art in the form of brush mowers, edging attachments, grass mowers, tillers and other similar equipment. Walk-behind powered units 10 typically have a frame 12 supported above the ground G by a pair of wheels 13 and an integral implement 40. An engine 15 defining the operative power of the unit 10 is supported on the frame 12. The engine has a rotatably power output shaft 16 on which is typically mounted a pulley to power a drive belt 19 for driving the integral implement 40. The frame 12 extends rearwardly and upwardly to form a pair of laterally spaced handlebars 14 which the operator can grasp to control the operation and direction of travel of the unit 10. Typically, the handlebars 14 will have controls (not shown) supported thereon to control various aspects of the engine 15.

FIGS. 1 and 3 depict the power unit 10 without an implement 40 attached thereto. Since the two wheels 13 provide only two points of contact with the ground, the implement 40 when attached to the implement mounting mechanism 20 or otherwise connected to the frame 12 will provide a third point of contact and, thereby, provide positional stability for the power unit 10. FIGS. 1 and 3, however, terminate with the implement mounting mechanism 20 forming the terminus of a pivoted support arm 25 that is supported by bearings 26 housed in the frame 12 of the mower 10 to permit pivotal movement about a vertical pivot axis 29 that is concentric with the generally vertical power output shaft 16. The support arm 25 is provided with appropriate attachment devices, such as bolt holes 22 and corresponding fasteners, or clamping devices (not shown) to connect an implement correspondingly fitted to attach to the implement mounting mechanism 20 and be carried by and powered by the power unit 10. The pivotal movement of the support arm 25 will enable the implement to be oriented in a variety of positions relative to the power unit 10, as will be described in greater detail below.

One skilled in the art will readily recognize that the implement mounting mechanism 20 can be formed in a variety of configurations. The configuration depicted in the drawings is of a hollow support arm 25 fitted to receive a corresponding mounting ann 48 on the work implement 40. A pair of attachment bolts (not shown) pass through holes 22, 49 formed in the respective support arm 25 and the mounting arm 48 to fix the work implement 40 to the power unit 10. One set of the holes 22, 49 are preferably slotted to permit adjustable movement of the mounting arm 48 relative to the support arm 25 for tensioning the drive belt 19, as will be described in greater detail below. Other configurations for the implement mounting mechanism 20 will permit the detachable mounting of the work implement 40 to the power unit 10. One such configuration is described in U. S. Provisional Patent Application Ser. No. 60/283,163, filed Apr. 12, 2001, from which domestic priority is claimed, the description of which being incorporated herein by reference.

As best seen in FIGS. 1, 2 and 4–9, a locking mechanism 30 is supported by the frame 12 to be engageable with the support arm 25 to control the pivotal movement thereof about the pivot axis 29. While the locking mechanism 30 may take one of many similar forms, the preferred embodiment of the locking mechanism 30 includes a semi-circular bracket 32 having a plurality of teeth 33 formed therein. A key 28 is formed in the top of the support arm to be integral therewith and be movable beneath the bracket 32 as the support arm 25 is pivoted about the pivot axis 29. The bracket 32 has as many teeth 33 or slots formed therein as pivoted positions are desired. Preferably at least five teeth 33 are formed to define a central, straight forward position and at least two different angular positions to both the left and right sides of the central position.

The locking mechanism 30 is preferably spring-loaded into a lowered pivoted position in engagement with the key 28 by a spring 35 interconnecting the bracket 32 and the frame 12. To effect pivotal movement of the support arm 25, the semi-circular bracket 32 must first be raised to disengage the support arm key 28. While this operation would preferably be manual in nature, remote actuation is possible, as is an interlock mechanism (not shown) that could be associated with the raising of the bracket 32 to prevent a powered operation of the attached implement 10 when the bracket is raised.

The preferred embodiment of the control mechanism (not shown) for controlling the pivoting of the bracket 32 would be a conventional cable mounted on the handle bars 14 for a convenient operation by the operator and connected to the bracket 32 to force movement thereof against the force exerted by the spring 35. An interlock mechanism is not preferred as the operation of the work implement 40 as the implement 40 is moved from side to side is preferred in some instances, such as with a mower implement 42 described in greater detail below.

Figure 7:
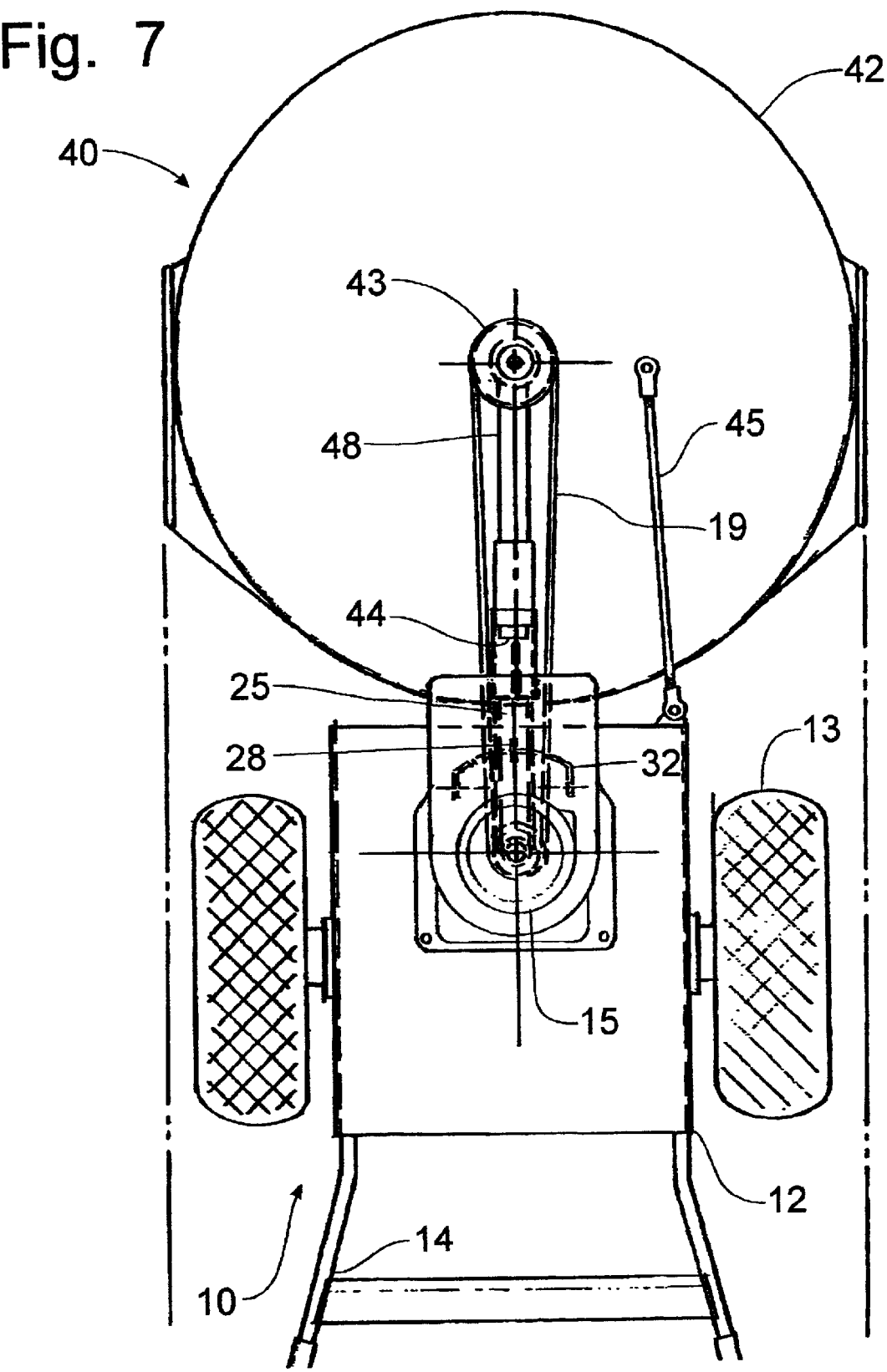
FIG. 7 is a top plan view of the power unit depicted in FIGS. 1 and 3 and having a mower implement detachably mounted via the implement mounting mechanism, the cutting width of the mower being depicted by spaced apart phantom lines, the implement mounting mechanism being oriented to direct the mower implement in a straight ahead orientation.
Figure 8:
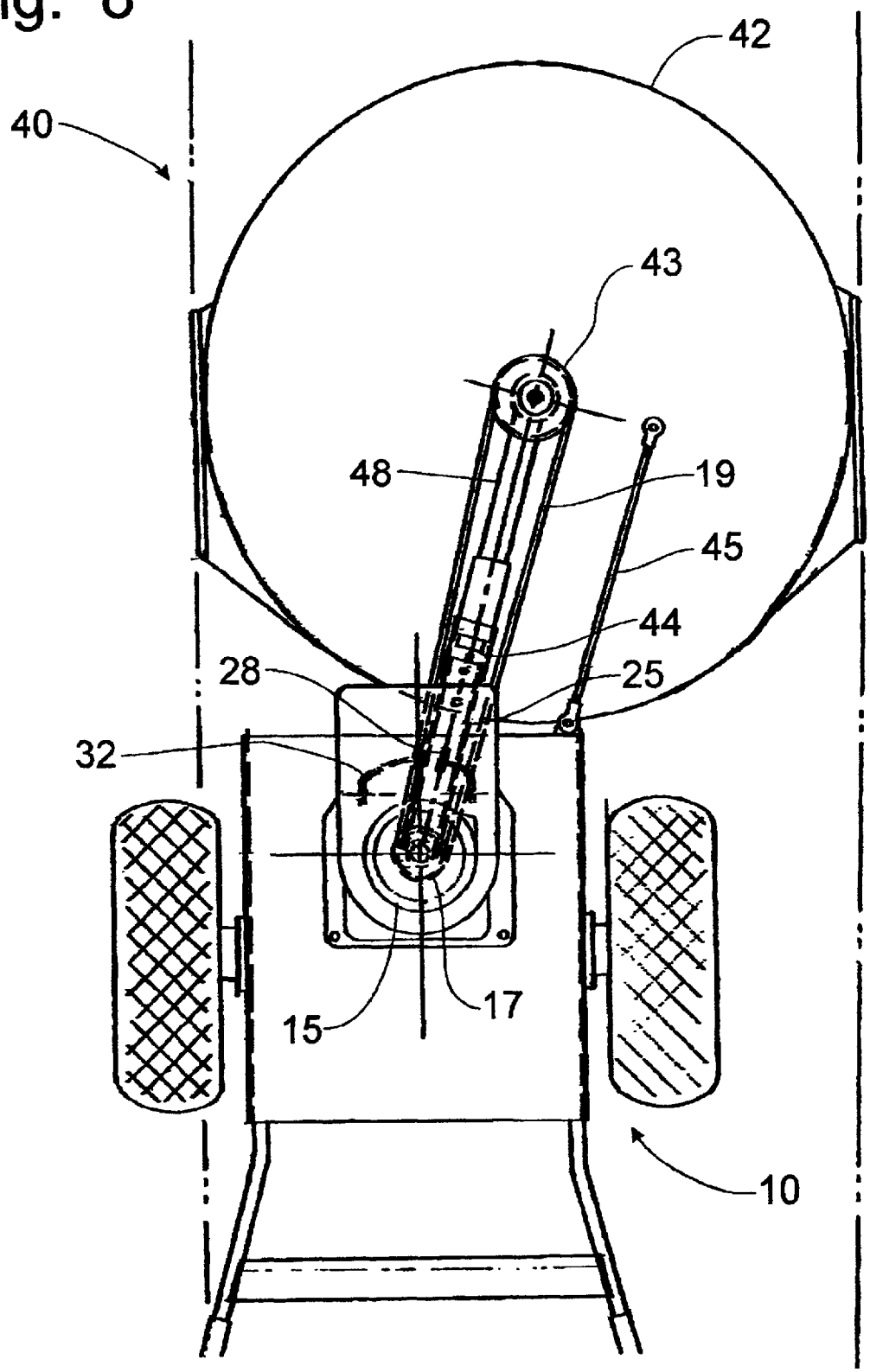
FIG. 8 is a top plan view of the power unit and attached mower implement as depicted in FIG. 7 but with the implement mounting mechanism being rotated to the right to orient the mower implement for mowing in an offset path as compared to the cutting path depicted in FIG. 7.
Figure 9:
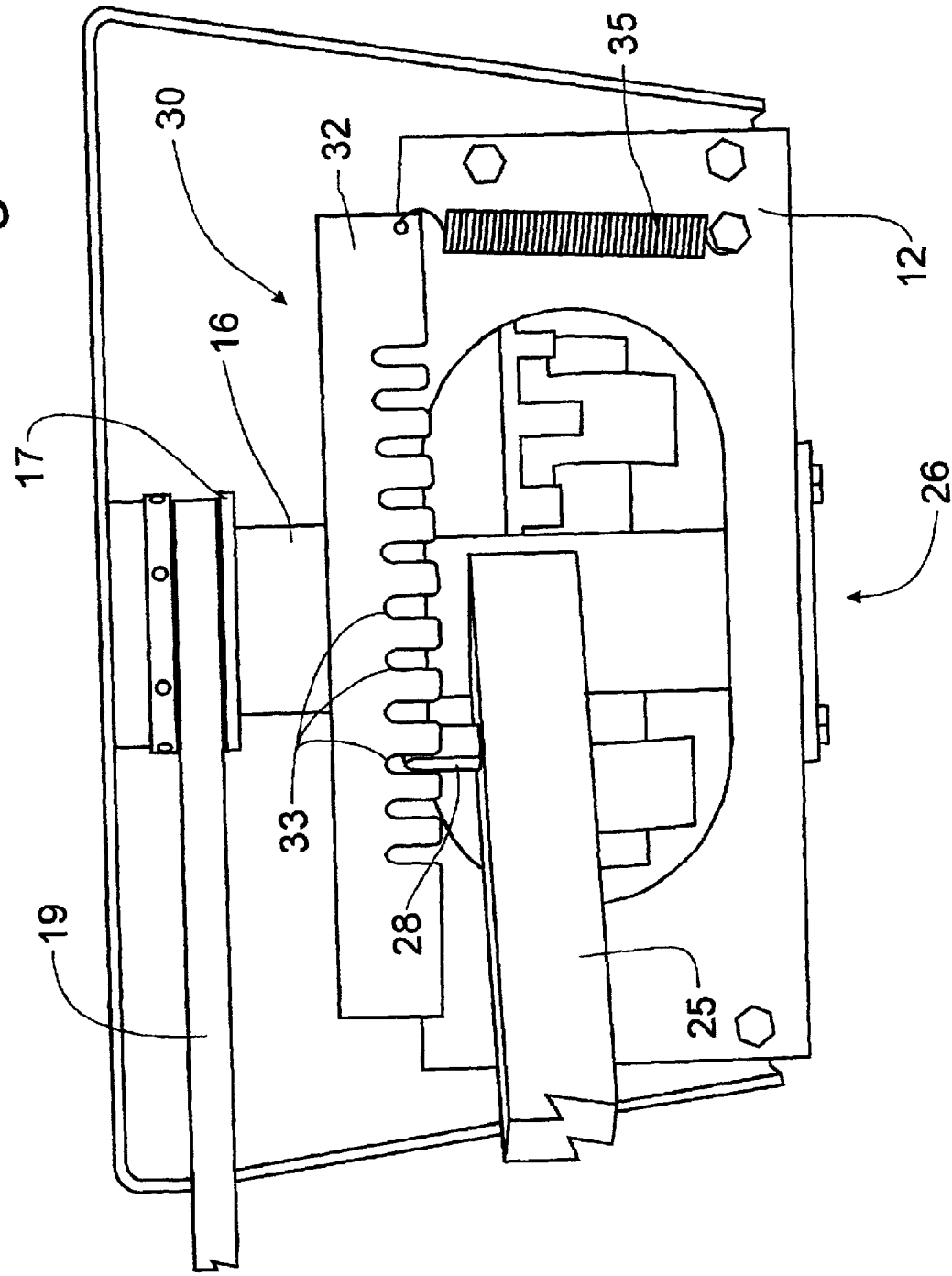
FIG. 9 is an enlarged detail view of the locking mechanism for controlling the pivotal movement of the support arm forming part of the implement mounting mechanism pivotally movable about a vertical axis concentric with the output shaft of the power unit engine.

As depicted in FIGS. 7 and 8, the attached implement 40 could be a powered brush mower or mower implement 42 operably powered through a drive belt 19 entrained around a driven pulley 43 and a drive pulley 17 affixed to said power output shaft 16. While a spring-loaded idler mechanism (not shown) can be supported on the mower implement 42 to engage the drive belt 19 and maintain proper driving tension therein during operation, a simpler mechanism of maintaining tension in the drive belt 19 is preferred. One such mechanism would be the use of slotted holes 49 in the mounting arm 48 of the mower implement 42 receive the attachment bolts (not shown) which also pass through the holes 22 in the support arm 25.

Positioning the mower implement 42 sufficiently far from the power unit 10 will impart proper tension in the drive belt 19. Tightening the attachment bolts (not shown) to fix the position of the mounting arm 48 relative to the support arm 25 will retain the tension in the drive belt 19. The slotted openings 22 or 49 will allow for a slight positional adjustment of the mower implement 42 to adjust the tension in the drive belt 19. An addition of a adjustment bolt 44 threadably supported in a tab on one of the support arm 25 or the mounting arm 48 and engaging a corresponding tab on the other of the support arm 25 or the mounting arm 48 would permit a finite positional adjustment of the mounting arm 48 relative to the support arm 25, within the limits defined by the length of the slotted openings 49, to adjust the tension in the drive belt 19.

Movement of the mower implement 42 to a position offset to either side of the central position shown in FIG. 7 is desirable with certain operations, such a mowing under fence rails and the like. Release of the locking mechanism 30 can be manual, remote or automated to provide the desired amount of convenience in operating the offset feature of the attached mower implement 42. As represented in FIG. 8, the mower can be pivoted to either side of the central position. An attitude control link 45 pivotally interconnects the frame 12 and the mower 42 to provide a rudimentary four bar linkage in conjunction with the pivoted support arm 25 that effects a parallel offset movement of the mower implement 42 from side to side.

Referring now to FIGS. 2–6, one skilled in the art will recognize that the attached implement 40 could be a powered disk edging mechanism 50 having a rotatable disk member 52 that is engageable with the ground to form a shallow ditch or trough around mulching beds or landscaping areas. The edging mechanism 50 includes a formed support arm member 55 detachably mounted to the implement mounting mechanism 20 to locate the disk member 52 at a position offset to the side of the power unit 10. The support arm member 55 includes a lateral portion 56 that extends outboard forwardly to the side of the power unit 10 and a longitudinal portion 57 that extends rearwardly to position the disk member 52 laterally to the side of the right wheel 13. A forwardly positioned caster wheel 51 engages the surface of the ground to help support the support member 55.

A plate 59 is mounted on the support member 55 to provide support for a gearbox 60. The drive belt 19 is entrained around the drive pulley 17 and a driven pulley 63 on the gearbox 60. As described above with respect to the mower implement 42, a spring-loaded idler mechanism (not shown) could be provided for the drive belt 19 and supported from the plate 59 to engage the drive belt 19 and provide tension therein for the transfer of rotational power from the drive pulley 17 to the gearbox 60. Preferably, however, a more simple tensioning mechanism as described above with respect to the mower implement 42 would be provided.

Preferably, the driven pulley 63 is mounted on a vertical input shaft 64 in a manner to be substantially parallel to the drive pulley 17. The ninety degree gearbox 60 transfers rotational power to a horizontally disposed output shaft 66 on which is mounted a drive transfer pulley 67 having a transfer drive belt 68 entrained thereon to transfer rotational power to a driven transfer pulley 69 which powers the rotation of the disk member 52. The longitudinal portion 57 of the support arm member 55 is formed with a yoke 58 that is pivotally attached to the plate 59 about a pivot axis 57a aligned with the horizontal output shaft 66. The pivoted yoke 58 allows the disk member to move vertically as a relief against any obstacles, such as rocks or roots, that might be encountered during operation without disrupting the power transmission being effected by the transfer drive belt 68, as the pivotal movement of the disk member 52 will not change the distance between the drive transfer pulley 67 and the driven transfer pulley 69.

Similar to the simplified belt tensioning mechanism described above with respect to the drive belt 19, the longitudinal portion 57 of the support arm member 55 is formed in two pieces connected together by connection bolts 54 fitted through a slotted opening to permit positional (longitudinal) adjustment of the disk member 52 relative to the gearbox 60, thereby changing the tension in the transfer drive belt 68. Similar to the adjustment bolt mechanism described above, an adjustment bolt interengaging the two pieces of the longitudinal portion 57 of the support arm member 55 will enable a finite adjustment of the tension in the transfer drive belt 68 within the limits defined by the slotted openings in the two pieces of the longitudinal portion 57.

Figure 4:
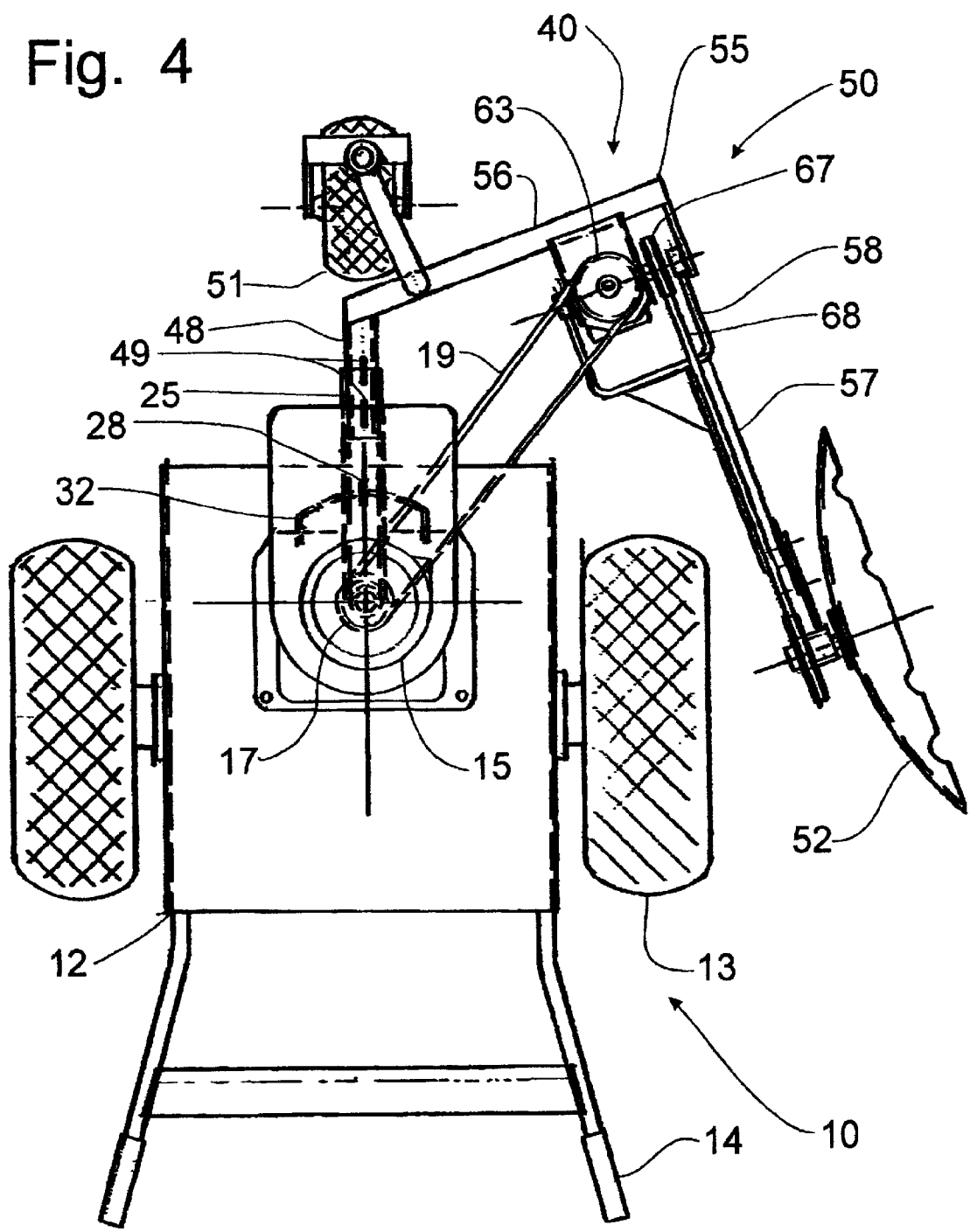
FIG. 4 is a top plan view of the power unit depicted in FIGS. 1 and 3, but having the edger implement detachably mounted thereon, the implement mounting mechanism being deployed to orient the edger implement in a straight forward direction.
Figure 5:
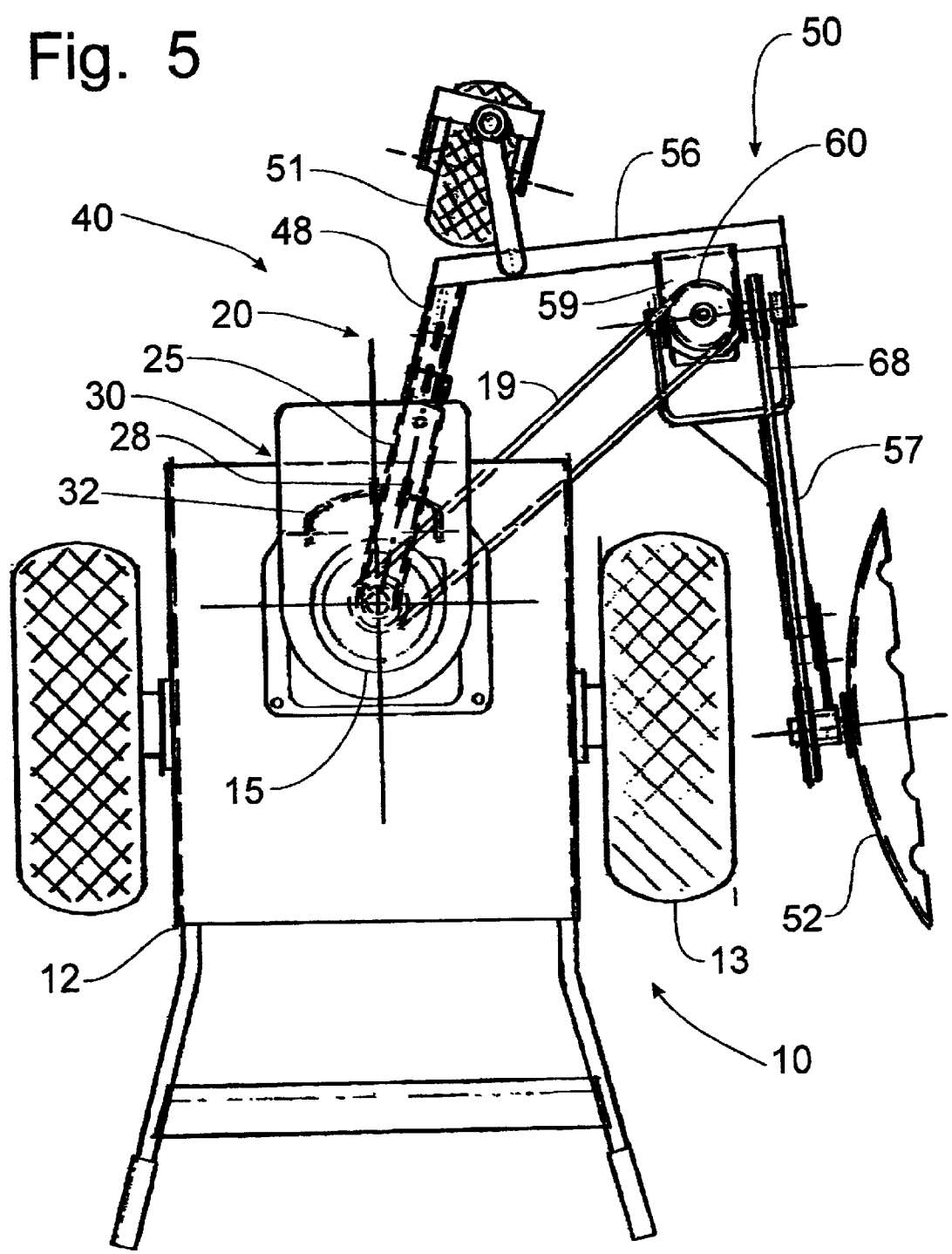
FIG. 5 is a top plan view of the power unit and attached edger implement as depicted in FIG. 4 but with the implement mounting mechanism being rotated to the right to orient the edger implement to change the orientation of the edging disk to cut a narrow swath.
Figure 6:
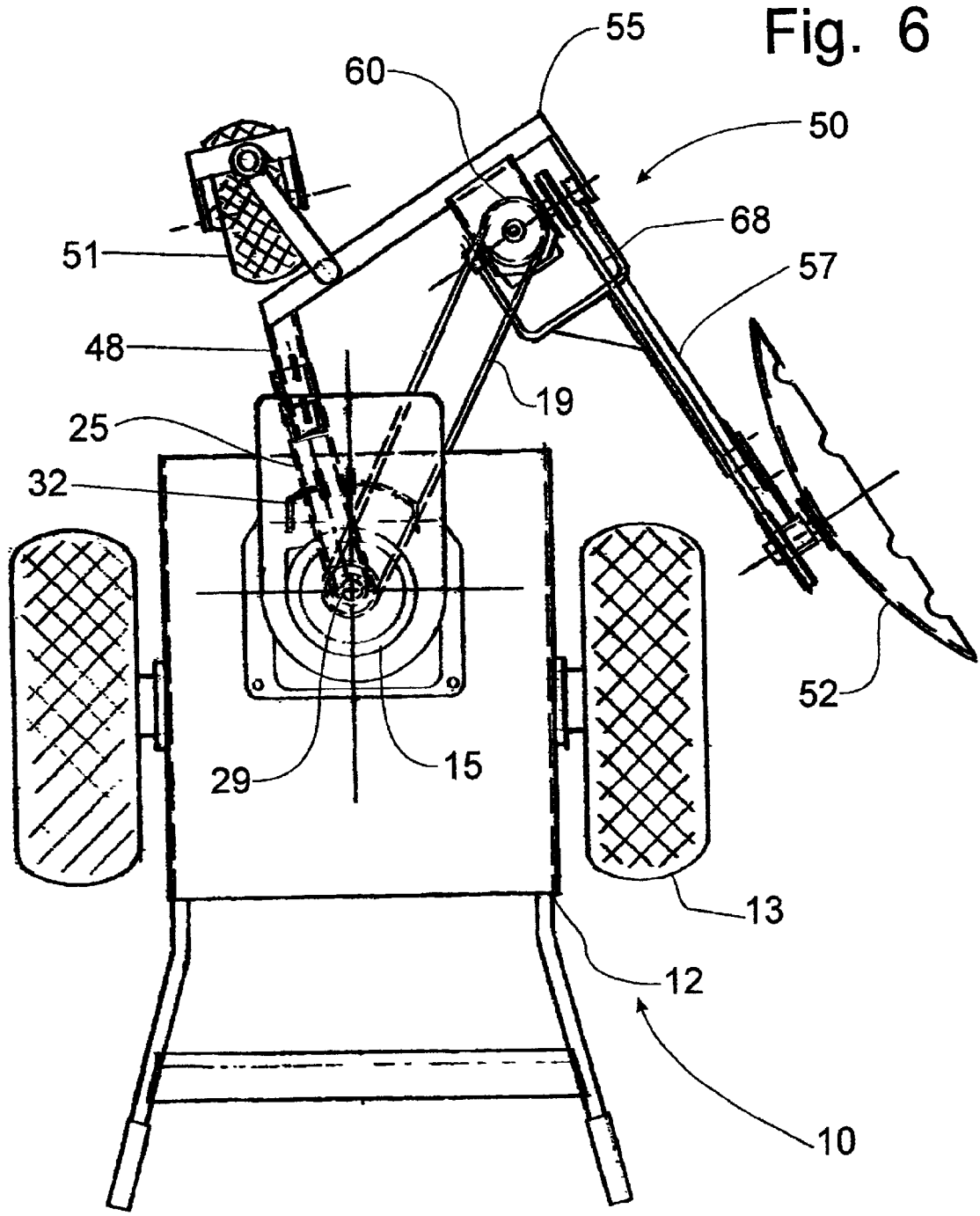
FIG. 6 is a top plan view of the power unit and attached edger implement as depicted in FIGS. 4 and 5, but with the implement mounting mechanism being rotated to the left to orient the edger implement to change the orientation of the edging disk to cut a wider swath.

By manipulation of the locking mechanism 30 to allow positional adjustment of the pivoted support arm 25, the operative angle of the disk member 52 can be varied, as is depicted in FIGS. 4–6. Placement of the support arm 25 in the rightmost position, as depicted in FIG. 5, places the disk member 52 at an orientation that is next to and generally parallel with the line of travel of the power unit 10, which is generally a transport position. The positioning of the support arm in the central, straight-away position, as is depicted in FIG. 4, moves the disk member 52 into a first operative position in which the rotatably powered disk member 52 can cut a trench into the surface of the ground. Further, a positioning of the pivoted support arm 25 in the leftmost position, as is depicted in FIG. 6, increases the angle at which the powered disk member 52 engages the ground, thereby causing the creation of a wider trench than is formed with the disk member 52 in the orientation shown in FIG. 4. The pivotal movement of the support arm 25 about the axis of the engine output shaft 16 allows the engagement angle of the disk member 52 to be varied without disrupting the power transmission of the drive belt 19.

In operation, the edging mechanism 50 is positioned adjacent a landscaped area, such as a mulch bed, where an edging trench is desired. The bracket 32 is lifted to permit the support arm 25 to be moved to a position other than the extreme rightmost pivoted position, which corresponds to the transport position as depicted in FIG. 5. For example, the pivoted support arm 25 could be located in the central position, as shown in FIG. 4, to position the powered disk member 52 at a cutting angle of approximately 20 degrees with respect to the direction of travel. If a wider trench is desired, the support arm 25 could be moved into the leftmost pivoted position to place the disk member 52 at a cutting angle of approximately 35 degrees with respect to the direction of travel. With the engine 15 running, the longitudinal portion 57 of the support member 55 is pivoted downwardly about the pivot axis 57a to engage the ground.

A latch mechanism 70 is carried on the support member 55 to restrain the pivotal movement of the longitudinal portion 57 about its pivot axis 57a. When engaged, the longitudinal portion 57 is fixed in a raised inoperative, transport position. The latch mechanism 70 can also be used to control the depth on engagement of the powered disk member 52 into the ground by limiting the amount of downward pivotal movement of the longitudinal portion 57. A handle (not shown) fixed to the distal end of the longitudinal portion 57 near the disk member 52 can be used to manually raise and lower the longitudinal portion 57 between the raised transport position and the lowered operating position.

While an idler mechanism associated with the transfer drive belt 68 could be utilized to control the transfer of rotational power to the disk member 52 in addition to controlling the tension in the transfer drive belt 68, the lack of any idler mechanism associated with either the drive belt 19 or the transfer drive belt 68 requires another device, such as a clutch, to disengage the transfer of rotational power to the disk member 52. Such a clutch can be incorporated into either the gearbox 60 or, preferably, the engine 15 and controlled by a conventional cable control (not shown).

Changing the cutting angle of the powered disk member 52 has an advantage over fixed angle edging mechanisms known in the art by allowing a wider trench profile to be formed when conditions favor the use of a wider edging trench, such as when the landscape edge is overgrown or has heavy or rough sod edges. The placement of the vertical pivot axis 29 for the implement support arm 25 in alignment with the output shaft 16 of the power unit engine 15 allows the cutting angle of the powered disk member 52 to be selectively varied without effecting the transfer of rotational power to the disk member 52, as the entire edging implement 50 pivots about the center of the drive pulley 17. Furthermore, the placement of the edging mechanism 50 into the above-described transport position, in which the disk member 52 presents a zero degree cutting angle with respect to the direction of travel, enables the disk member 52 to be removed and replaced by another rotary power tool (not shown) that is best used in this orientation, such as a sidewalk edger, a trencher, or a rotary cultivator.

The implement mounting mechanism 20 provides the ability to utilize the power unit 10 for a variety of powered implements 40 to be attached thereto for operative connection with the engine 15. Examples of possible implements to be attached include the mower 42 and the edging mechanism 50 shown in the drawings. Other examples of implements that could be attached would be a tiller mechanism, a snow blower, a ditching mechanism, rotary broom, string trimmer, and brush or grass mowers. Accordingly, the power unit 10 can be utilized in an effective and efficiently flexible manner. Articulation of the powered implement in a side-to-side manner can be easily accomplished, even during operation, providing operational advantages heretofore unknown in the prior art implements.

Figure 10:
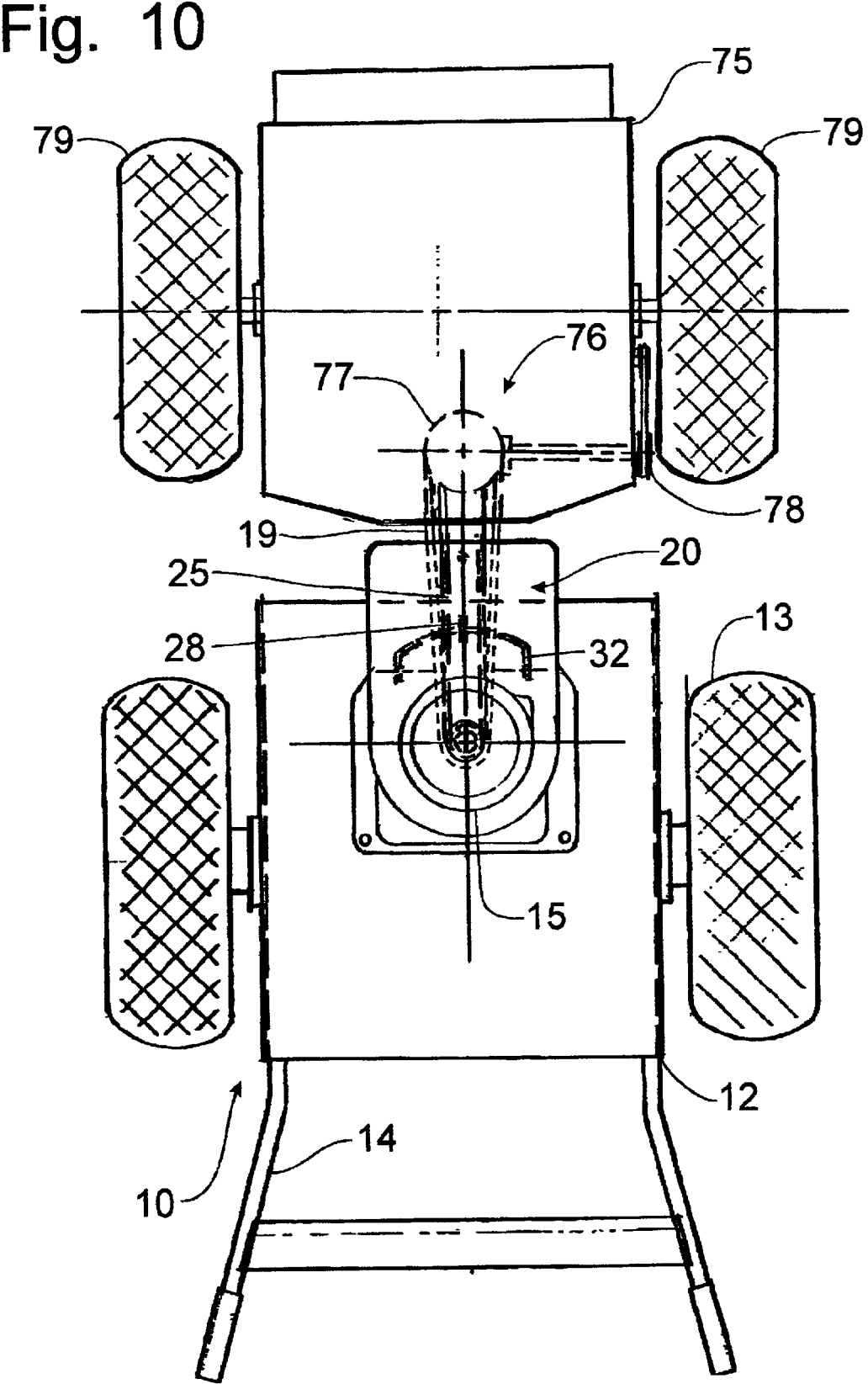
FIG. 10 is a top plan view of the power unit depicted in FIGS. 1 and 3 and having a wheeled implement detachably mounted via the implement mounting mechanism and powered through the power unit drive mechanism.
Figure 11:
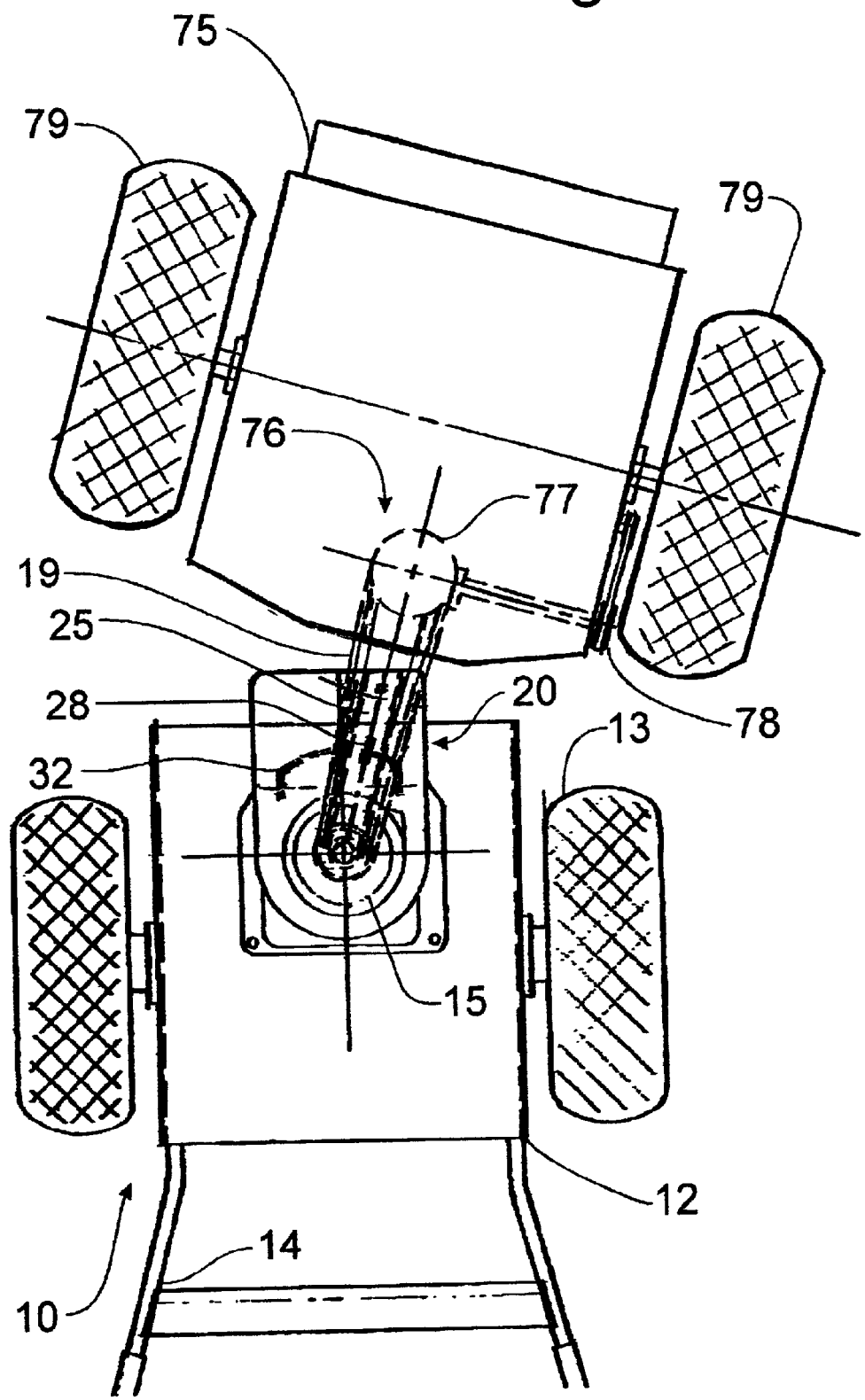
FIG. 11 is a top plan view of the power unit and attached wheeled implement as depicted in FIG. 10 but with the implement mounting mechanism being rotated to the right to effect steering of the wheeled implement by articulation of the combined power unit/attached wheeled implement about the pivot axis of the implement mounting mechanism.

As best seen in FIGS. 10 and 11, the attached powered implement 75 can be a wheeled implement that is connected to the power unit via the implement mounting mechanism 20 and driven by the drive belt 19 receiving rotational power, as described above, from the engine 15. The powered, wheeled implement 75 can have its own secondary drive mechanism 76 to transfer rotational power delivered by the drive belt 19 to the various powered components (not shown) on the implement 75. As depicted in FIGS. 10 and 11, the secondary drive mechanism 76 can include a gearbox 77 and other related drive components 78. Since the implement 75 is supported by fixed wheels 79, the lateral movement of the implement 75 cannot be accomplished through a simple pivoting of the implement mounting mechanism 20 as is described above. The combined power unit 10 and attached wheeled implement 75 form a four wheeled apparatus that is articulated by the pivoted implement mounting mechanism 20. Accordingly, steering of the combined apparatus 10, 75 can be accomplished by pivoting the implement mounting mechanism 20 about the vertical axis 29 while the combined apparatus 10, 75 is moving, which effects steering of the combined apparatus 10, 75 through articulation of the apparatus 10, 75, as is depicted in FIG. 11. Accordingly, the pivotal movement of the support arm 25 would preferably be controlled through a remotely controlled device accessibly mounted on the handle bars 14 of the power unit 10.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A powered landscape edging apparatus comprising:
   a power unit having a frame supported for movement over the ground by a pair of wheels and an engine providing a source of rotational power;
   an implement mounting mechanism pivotally supported by said frame for pivotal movement about a generally vertical axis of rotation, said implement mounting mechanism including a support arm extending generally orthogonally to said axis of rotation;
   an edging implement having a mounting arm connected to said support arm to be pivotally movable therewith, said mounting arm having a transverse portion to position said edging implement outboard of said frame, said edging implement including a generally vertically oriented disk member rotatably mounted on said mounting arm configured to position said disk member adjacent one of said wheels, the pivotal movement of said support arm and said mounting arm positioning said disk member through a range of movement including a positioning of a cutting plane of said disk member parallel to a direction of travel of said landscape edging apparatus and at an angle to said direction of travel, said transverse portion of said mounting arm extending to a longitudinal portion, said longitudinal portion extending rearwardly from said transverse portion to position said disk member outboard of said one wheel said longitudinal portion including a yoke defining a generally transversely extending pivot axis for said longitudinal portion to permit a vertical movement of said disk member relative to said transverse portion of said mounting arm; and
   a drive mechanism operatively interconnecting said engine and said disk member to power the rotation of said disk member drive mechanism interconnecting said power output shaft and said work implement, said axis of rotation coinciding with said power output shaft so that said work implement can pivot about said axis of rotation without disrupting the transfer of rotational power from said engine power output shaft.

2. The landscape edging apparatus of claim 1 wherein said mounting arm is detachably connected to said support arm to detachably mount said edging implement on said power unit.

3. The landscape edging apparatus of claim 1 wherein said drive mechanism comprises:
   a gearbox mounted on said mounting arm and having a power input shaft and a power output shaft;
   a first drive belt transferring rotational power from said engine to said power input shaft of said gearbox; and
   a second drive belt transferring rotational power from said power output shaft of said gearbox to said disk member, said transverse pivot axis defined by said yoke coinciding with said power output shaft so that tension in said second drive belt would not be affected by the vertical movement of said disk member about said transverse pivot axis.

4. The landscape edging apparatus of claim 3 wherein tension in said first drive belt member is adjusted through a positional movement of said mounting member relative to said support arm, thereby changing the distance between said gearbox power input shaft and said engine, said longitudinal portion of said mounting arm being formed in two pieces with one piece mounting said disk member and being positionally movable relative to said the other piece, said tension in said second drive belt being adjusted through the movement of said one piece relative to the other piece thereby changing the distance between said disk member and said power output shaft of said gearbox.

5. The landscape edging apparatus of claim 1 wherein said range of movement of said edging implement about said axis of rotation changes the orientation of said disk member relative to the ground such that an angle at which said disk member engages the ground to form a trough therein varies correspondingly to the pivoted position of said implement mounting mechanism.

6. The landscape edging apparatus of claim 5 wherein said engine has a power output shaft, said axis of rotation coinciding with said engine power output shaft.

7. The landscape edging apparatus of claim 6 further comprising:
   a locking mechanism supported by said frame forwardly of said engine and selectively engaging said support arm to control the pivotal movement thereof about said axis of rotation.

8. The landscape edging apparatus of claim 7 wherein said locking mechanism comprises:
   a bracket pivotally supported on said frame, said bracket including a plurality of slots formed therein;
   a key mounted on said support arm for engagement with said bracket, said key being restrained with a selected one of said slots to fix the pivoted position of said support arm about said axis of rotation; and
   a spring interengaging said bracket and said frame to urge said bracket into engagement with said key.

9. The landscape edging apparatus of claim 8 wherein said bracket is arcuate with a center of curvature generally coinciding with said axis of rotation.

10. The landscape edging apparatus of claim 9 wherein said power unit is a walk-behind version with said frame terminating rearwardly in a pair of handle bars for manipulation by an operator.

* * * * *